(12) United States Patent
Mol

(10) Patent No.: US 8,163,214 B2
(45) Date of Patent: Apr. 24, 2012

(54) CONVEYOR BELT

(75) Inventor: Edward T. Mol, Marne, MI (US)

(73) Assignee: Thermodrive LLC, Grand Rapids, MI (US)

( * ) Notice: Subject to any disclaimer, the term of this patent is extended or adjusted under 35 U.S.C. 154(b) by 141 days.

(21) Appl. No.: 12/211,149

(22) Filed: Sep. 16, 2008

(65) Prior Publication Data

US 2009/0008025 A1    Jan. 8, 2009

Related U.S. Application Data

(60) Continuation of application No. 11/686,550, filed on Mar. 15, 2007, now Pat. No. 7,424,948, which is a division of application No. 10/505,063, filed as application No. PCT/US03/03029 on Feb. 3, 2003, now Pat. No. 7,210,573.

(60) Provisional application No. 60/319,133, filed on Mar. 5, 2002.

(51) Int. Cl.
*D01D 5/20* (2006.01)

(52) U.S. Cl. ............ 264/167; 264/171.21; 264/175; 264/211.12; 264/280; 264/283; 264/284

(58) Field of Classification Search .......... 264/167, 264/171.21, 175, 211.12, 280, 283, 284
See application file for complete search history.

(56) References Cited

U.S. PATENT DOCUMENTS

| | | | |
|---|---|---|---|
| 3,083,583 A | 4/1963 | Szonn | |
| 3,404,578 A | 10/1968 | Koch et al. | |
| 4,047,444 A | 9/1977 | Jeffrey | |
| 4,127,040 A | 11/1978 | Moore et al. | |
| 4,170,281 A | 10/1979 | Lapeyre | |
| 4,395,298 A * | 7/1983 | Wetzel et al. | 156/137 |
| 4,634,409 A | 1/1987 | Johnson et al. | |
| 4,769,202 A * | 9/1988 | Eroskey et al. | 264/166 |
| 5,037,360 A | 8/1991 | Fujiwara et al. | |
| 5,498,214 A | 3/1996 | Macchiarulo et al. | |
| 5,653,656 A * | 8/1997 | Thomas et al. | 474/205 |
| 5,662,541 A | 9/1997 | Roovers | |
| 5,697,491 A | 12/1997 | Alex | |
| 5,911,307 A * | 6/1999 | Kraft et al. | 198/847 |
| 6,039,964 A | 3/2000 | Sanduja et al. | |

(Continued)

FOREIGN PATENT DOCUMENTS

| | | |
|---|---|---|
| DE | 10 77 938 B | 3/1960 |
| DE | 37 24 564 A | 2/1989 |
| DE | 42 26 999 A | 7/1994 |
| JP | 09058834 A * | 3/1997 |

OTHER PUBLICATIONS

F.N. Sheppard & Co. Belting Specialties, Belt Design Catalog, 52 pages, Copyright 2000, USA.

(Continued)

*Primary Examiner* — Philip Tucker
*Assistant Examiner* — Amjad Abraham
(74) *Attorney, Agent, or Firm* — McGarry Bair PC

(57) ABSTRACT

A thermoplastic endless belt has a smooth outer surface substantially free of discontinuities and an inner surface with a plurality of teeth at a given belt pitch. The teeth are adapted to engage a sprocket with circumferentially spaced sheaves at a sprocket pitch greater than the belt pitch. The belt is slightly stretchable so that the sprocket can drive the endless belt when engaging the teeth within a range of load on the belt. The belt is preferred for use in conveyors in food processing industries where the smooth outer surface can transport food items and is easier to clean and keep free of impurities.

5 Claims, 7 Drawing Sheets

U.S. PATENT DOCUMENTS

| | | | |
|---|---|---|---|
| 6,220,754 B1 * | 4/2001 | Stiglic et al. | 383/64 |
| 6,561,344 B1 | 5/2003 | Basse | |
| 6,758,734 B2 | 7/2004 | Braunschweig et al. | |
| 7,210,573 B2 | 5/2007 | Mol | |
| 2004/0089519 A1 * | 5/2004 | Pollak et al. | 198/834 |

OTHER PUBLICATIONS

Mectrol Urethane Timing Belts, Catalog, 33 pages, Coyright 1996, USA.

Cog-Veyor Belting Manufacturers, Catalog, 25 pages, Canada.

* cited by examiner

CONVEYOR BELT

CROSS-REFERENCE TO RELATED APPLICATIONS

This application claims the benefit of U.S. Application No. 60/319,133 filed Mar. 5, 2002, International Application No. PCT/US2003/003029 filed Feb. 3, 2003, U.S. application Ser. No. 10/505,063 filed Aug. 18, 2004, now U.S. Pat. No. 7,210,573, issued May 1, 2007, and is a continuation of U.S. application Ser. No. 11/686,550 filed Mar. 15, 2007, now U.S. Pat. No. 7,424,948, issued Sep. 16, 2008.

BACKGROUND OF THE INVENTION

1. Field of the Invention

This invention relates to endless belts for conveyors and, more particularly, to thermoplastic endless belts driven by sprockets.

2. Description of the Related Art

Low tension, direct drive conveyor belts are typically used in situations where hygiene and cleanliness are critically important. For example, in food processing plants such as those that process meat products for human consumption, low tension, direct drive belt conveyors are used to transport items. Sanitation is critically important and, therefore, the endless belts used in such conveyors are conventionally made of materials that can be hygienically cleaned, such as thermoplastics or stainless steel.

Known belts are typically formed of interlocking links having teeth that are adapted to engage drive sprockets. One of the problems with such belts is that food particles can become lodged in the joints of the interconnecting links. Consequently, cleaning the belts can be difficult and may require removing the belt from the conveyor system for special cleaning operations.

One solution to this problem is the use of flexible thermoplastic belts without interlocking links such as that disclosed in U.S. Pat. No. 5,697,491. Such belts having a smooth continuous surface (sometimes called "homogeneous belts") are driven by V-guides wherein a radial groove in a drive pulley engages a longitudinal rib on the underside of the belt. One of the problems with such belts is that grease and oil from the food items can migrate to the groove or to the rib, which causes a loss of friction between the pulley and the belt. Consequently the driving force becomes unstable and unreliable. Moreover, such belts are under tension to ensure that the pulley imparts enough driving force. This tensioning raises other issues beyond slippage due to oils and contaminants. A thermoplastic belt under tension will stretch, which may require adjustment of the tension from time to time. In addition, there are additional costs associated with ensuring that the conveyor frame be sufficiently strong enough to handle the normal stresses of the pretensioned belt plus additional stresses caused by loading the belt.

It is known to provide a drive sprocket or drum with transverse grooves that are complementary in shape to teeth on a flexible conveyor belt, as shown for example in U.S. Pat. No. 4,170,281. However, the belt is formed from interlocking links and the belt is still under tension. The problems associated with interlocking links and pretensioning remains.

Another solution is disclosed in U.S. Pat. No. 5,911,307 where a timing belt is added to a homogeneous belt to engage a drive sprocket. As a result, reliance upon friction for motion is minimized, and the belt need not be under tension. There are some remaining problems, however. Assembling a timing belt to a homogeneous belt is costly and the bonding or adhering process is critical. Failure of the bond increases the risk of contamination and total belt failure.

SUMMARY OF THE INVENTION

In accord with the invention, a method of making a conveyor belt segment with integrally formed teeth for a conveyor belt in a conveyor where the belt is driven by engagement of the teeth with sheaves on a pulley includes the steps of extruding a substantially unreinforced flat ribbon of a thermoplastic material having an inner surface and an outer surface substantially free of discontinuities, providing a profile drum with a plurality of grooves on its outer surface, corresponding in shape to the teeth, passing the flat ribbon over the outer surface of the profile drum, compressing the inner surface of the flat ribbon against the outer surface of the profile drum surface while the flat ribbon is still soft and malleable with a preselected pressure so as to displace spaced apart portions of the inner surface of the flat ribbon by the thermoplastic material flowing into the grooves of the profile drum to thereby form a spaced apart series of teeth between formed flat ribbon portions of generally constant thickness in a formed ribbon, causing the formed ribbon to exit the profile drum and the compression; and passing the formed ribbon through a cooling station for a predetermined time to shrink the formed ribbon to preselected dimensions and to harden the formed ribbon so as to maintain the preselected dimensions. All steps are done in a continuous process to form an unreinforced, homogeneous belt segment that can be made to a selected length, stretchable through its length, and with the ends spliced together will form an endless conveyor belt of predetermined size.

Preferably, the belt is stretchable within a range of up to three percent of its total length. As well, the inner surface and the teeth can also be treated with an anti-bacterial agent. The teeth can extend from one edge of the belt to the other. And the thermoplastic material can be polyester or polyurethane.

DESCRIPTION OF THE PREFERRED EMBODIMENT

Figure 1:
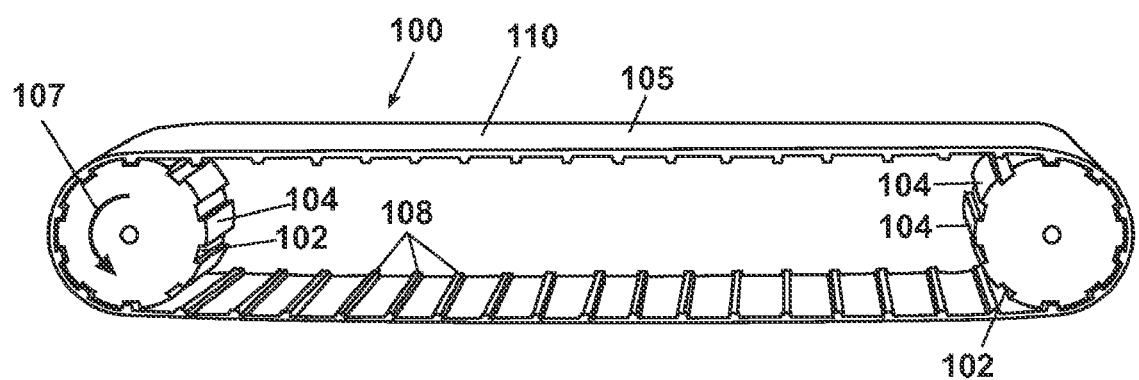
FIG. 1 is a perspective side view of a belt according to the invention installed between two sprockets.

An endless belt 100 according to the invention is seen in FIG. 1 in a typical installation between two sprockets 102 and 103. The sprockets 102, 103 are conventional and they can be any of a number of different forms and sizes. One sprocket 102 is a drive sprocket, the other 103 being an idler or slave sprocket. In this configuration, the upper span 105 of the belt will travel in the direction of arrow 107. Each sprocket 102 or 103 has a number of transverse grooves or sheaves 104 spaced around its circumference. The belt 100 has a plurality of teeth 106 equidistantly spaced from each other on the inside surface 108 of the belt. The teeth 106 engage the sheaves 104 of each sprocket. It will be understood that any given installation may have one, two, or more sprockets for a single endless belt. Also, for any given installation, one or more of the sprockets may be a drive sprocket, as for example sprocket 102, with the other sprocket or sprockets being idler sprockets. It will be understood that there need only be enough tension on the endless belt 100 to keep at least one of its teeth 106 engaged in a sheave 104 of the drive sprocket 102.

The belt 100 has an outside surface 110 that is fairly smooth and free of discontinuities. Preferably, the belt 100 is made of a thermoplastic material such as Pebax® resin, polyester or polyurethane. The outside surface 110 on the upper span 105 is the carrying surface for transport of items. Because it is smooth and free of discontinuities, there is no place for particles or contaminants to lodge. Moreover, the belt 100 can be cleaned in situ, without the need to remove it from the installation.

Figure 2:
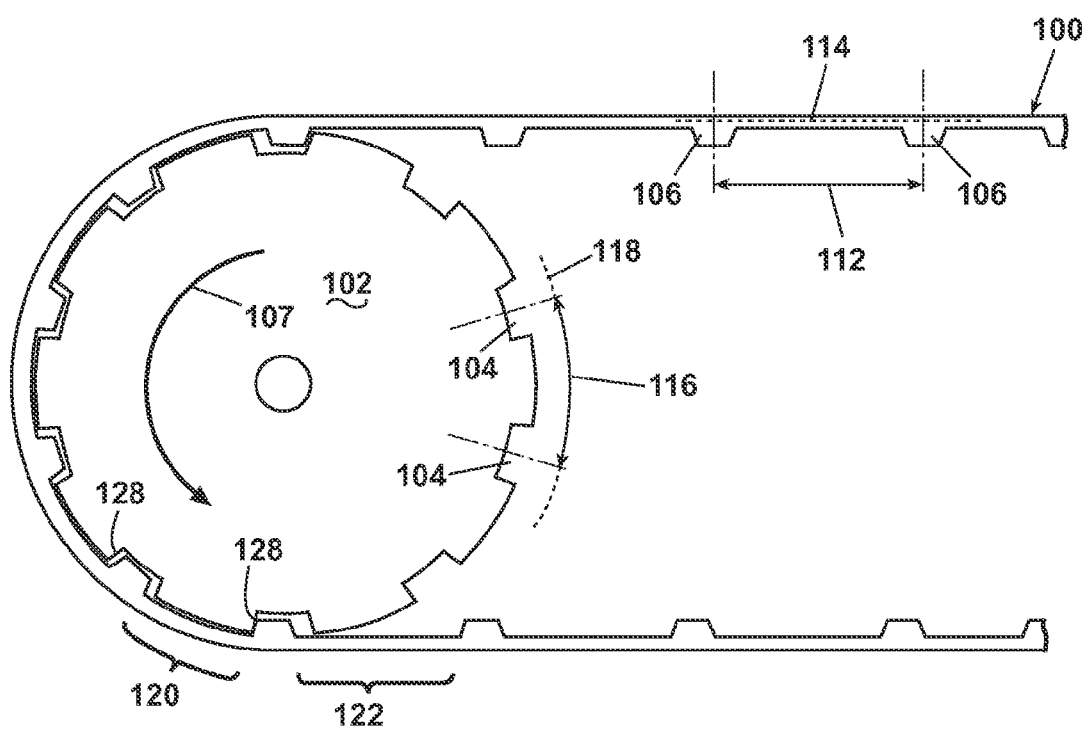
FIG. 2 is an enlarged view in elevation of a portion of FIG. 1.
Figure 3:
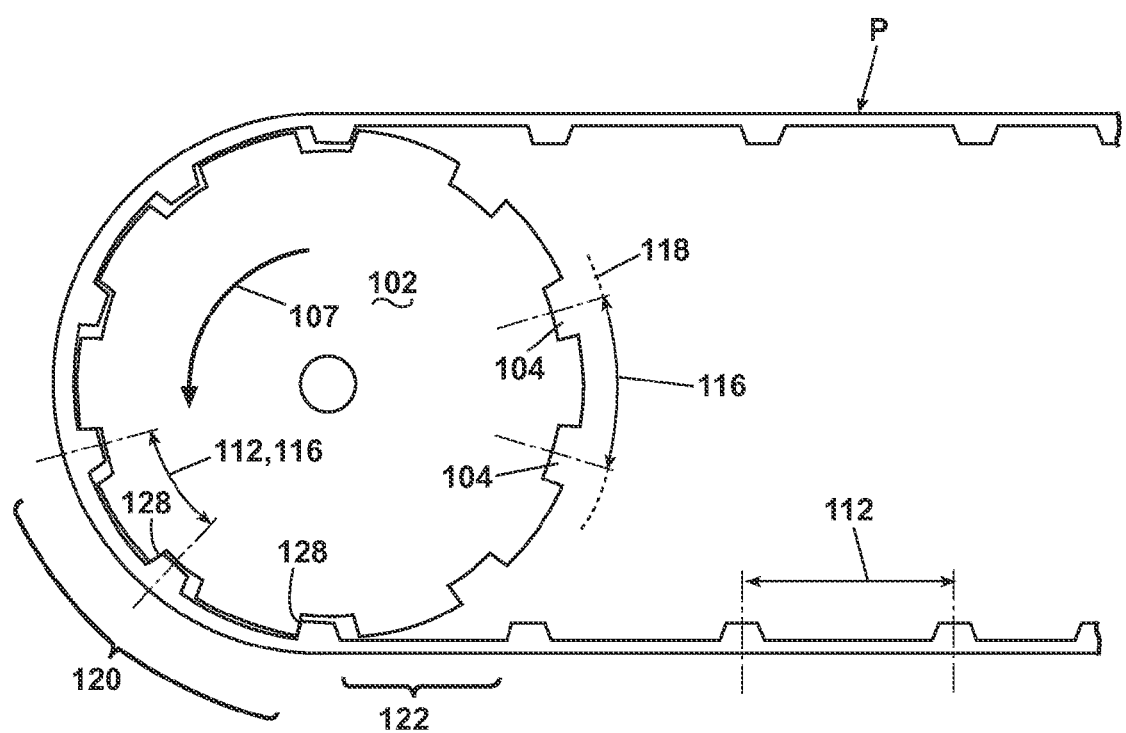
FIG. 3 is a view similar to FIG. 2 with the belt under load.

Greater detail about the structure of the belt 100 is shown in FIGS. 2 and 3. A combination of material selection and construction enables the belt to stretch within a range of 0-3% of its total length under a load ranging from 0-100 pounds per inch of width (nearly 18 Kg per cm). The belt 100 has a pitch 112 defined as the distance between the centerlines of adjacent teeth 106. The belt pitch 112 is measured along a belt pitch line 114, which corresponds to the neutral bending axis of the belt. As the belt 100 bends around the sprocket 102, the neutral bending axis is that imaginary plane on one side of which the belt material is under compression and on the other side of which the belt material is under tension.

Similarly, the sprocket pitch 116 is the arc length between the centerlines of adjacent sheaves 104, measured along the sprocket's pitch circle 118. The sprocket pitch circle 118 in this case corresponds to the belt pitch line 114 as the belt 100 moves around the sprocket 102. In other words, the sprocket pitch circle 118 will have the same radius as the belt pitch line 114 as the belt goes around the sprocket. For a thermoplastic belt, the area of greatest stress on the belt 100 occurs at zone 120, and the area of least stress occurs at zone 122 just as the belt is released from the drive sprocket 102.

Figure 4:
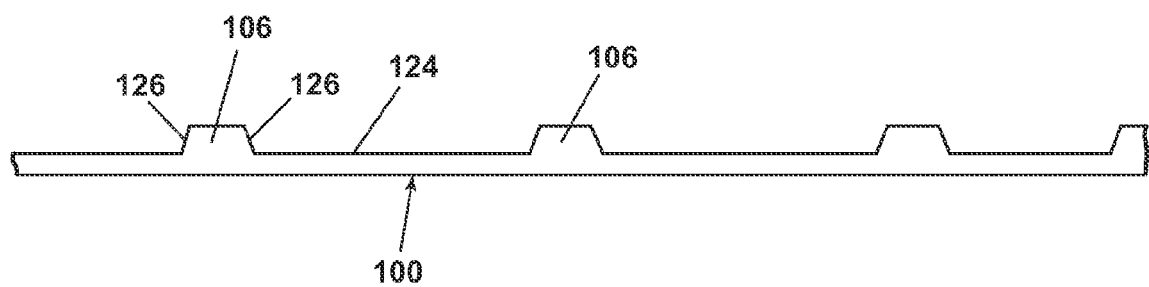
FIG. 4 is a side elevational view of a portion of the belt, partially in cross-section, shown in FIGS. 1-3.

Looking now also at FIG. 4, it can be seen that each tooth 106 extends upwardly from a surrounding inner surface 124 of the belt 100. Preferably, the belt 100 has a thickness between adjacent teeth 106 in a range of approximately 3 to 4 mm, although it will be understood that the actual thickness will depend upon a given application. The invention is not limited to a particular thickness of the belt. For this embodiment, each tooth 106 stands approximately 4 mm above the inner surface 124. Each tooth 106 has tapered sidewalls 126, each sidewall preferably tapering from the inner surface 124 at an angle of about 72.5 degrees. Each tooth will thus have a width at its base wider than that at the tip. Each sheave 104 on the sprocket 102 is wider than the corresponding tooth 106 on the belt 100, preferably on the order of 11 to 15 percent, and is tapered with drive walls 128. Thus, for example, if the widest part of the tooth 106 is 8 mm, the widest part of a sheave 104 might be 11.25 mm, permitting a belt stretch of up to 3% where the teeth 106 can still be received in the sheaves 104. If the widest part of a sheave is 10 mm, the widest part of a tooth can be 7 mm in order to permit belt stretch of up to 3%. It is recognized that the belt will not stretch evenly, i.e., it will stretch more between the teeth than including the teeth. This is because the belt is thinner between the teeth than at the teeth. Nevertheless, stretch here is measured overall, regardless of which portion of the belt is actually stretching under load. Also, the depth of each sheave 104 is greater than the height of each tooth 106 wherein each drive wall 128 is longer than a corresponding sidewall 126 so that the tooth will not bottom out in the sheave.

The belt pitch 112 when the belt 100 is at rest is less than the sprocket pitch 116. Thus, as illustrated in FIG. 2, a belt 100 under no load will effectively be driven in the stress zone 120 by the drive wall 128 of a single sheave 104 acting against sidewall 126 of a single tooth 106 received within the sheave. On the other hand, as illustrated in FIG. 3, a belt 100 under load P tends to stretch so that the belt pitch 112, especially within the stress zone 120, more nearly equals the sprocket pitch 116. In this case, more teeth 106 are engaged by corresponding sheaves 104. Under maximum stress, the belt pitch 112 will equal the sprocket pitch 116 as the belt 100 is pulled around the sprocket 102. In the embodiment illustrated in FIG. 3 wherein the sprocket 102 has ten sheaves 104, the maximum number of sheaves that will drive a corresponding tooth, at least in whole or in part, is six. Since the teeth 106 are smaller than the sheaves 104, and since the belt pitch 112 is smaller than the sprocket pitch 116 (below maximum load), the elasticity of the belt will permit anywhere from one to six teeth on the belt to be driven by the sprocket 102. The higher the load on the belt, the more teeth will be engaged by the sprocket.

Figure 5:
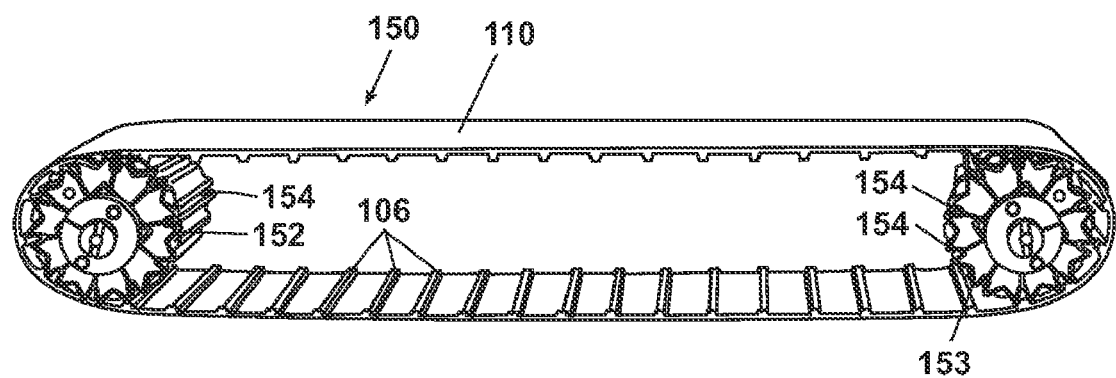
FIG. 5 is a perspective side view of a belt according to the invention installed between two sprockets of a different configuration than FIG. 1.
Figure 6:
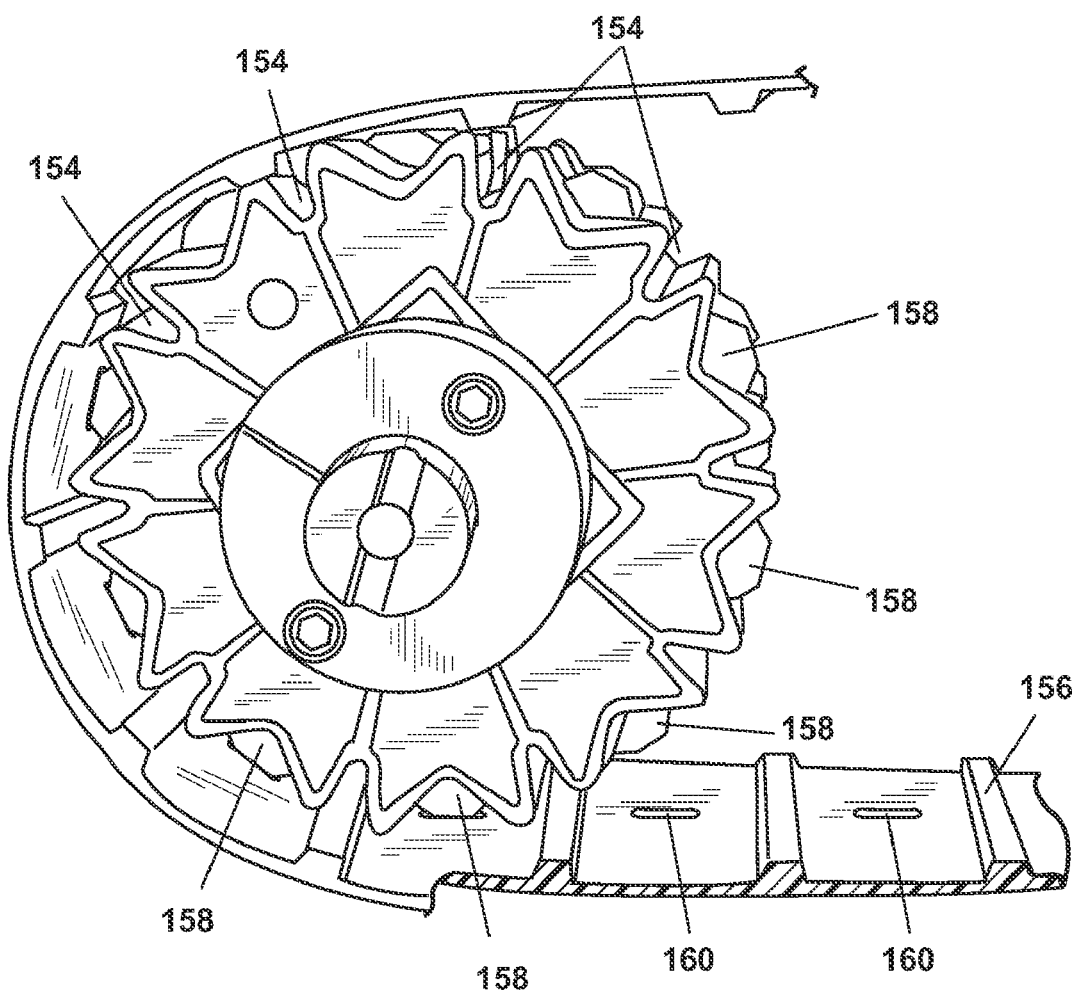
FIG. 6 is an enlarged view of a portion of FIG. 5.

Looking now at FIGS. 5 and 6, it can be seen that a belt 150 according to the invention can be used with existing sprockets. Here, the belt 150 is shown installed on sprockets 152 and 153 of the type that can be obtained from Intralox, Inc. Sprocket 152 may be a drive sprocket, in which case sprocket 153 will be the slave sprocket. Each sprocket 152, 153 has a number of transverse grooves or sheaves 154 adapted to receive teeth 156 in driving engagement as described above. The relative dimensions of components in this embodiment will be as described above for the embodiment of FIGS. 2 and 3. In addition, there may be tracking tabs 158 adapted to engage corresponding slots 160 in the belt 150 to maintain proper alignment of the belt.

Figure 7:
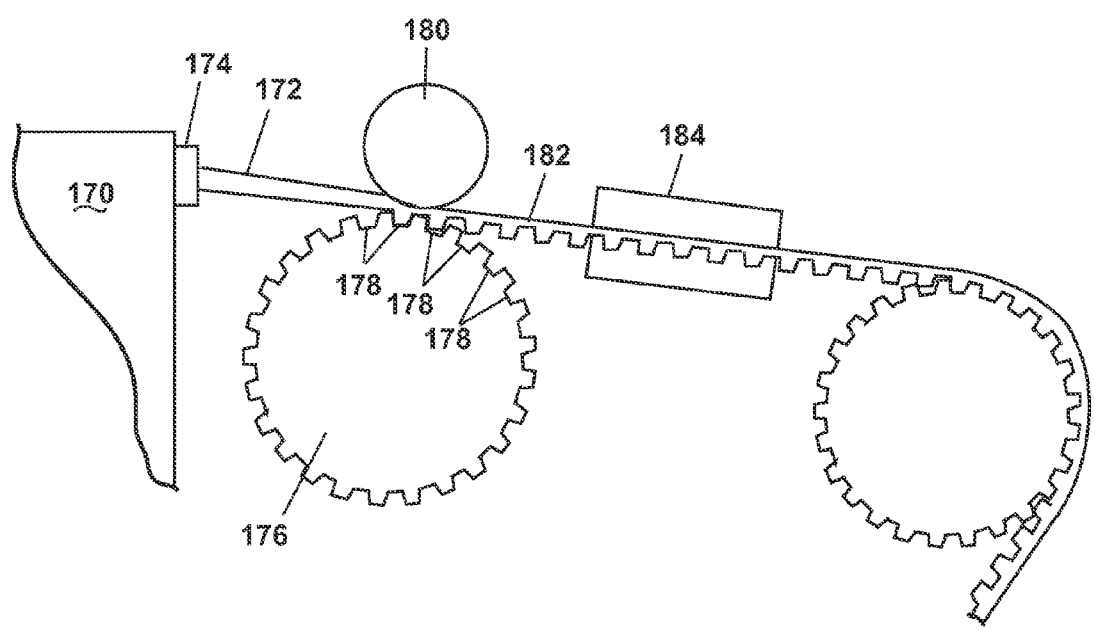
FIG. 7 is diagrammatic view illustrating a method of making a belt according to the invention.

Preferably, the teeth 106, 156 will be integral with the belt 100, 150. A method of making an endless belt according to the invention is shown in FIG. 7. An appropriate thermoplastic material such as polyester or polyurethane is placed in an extruder 170. Using conventional extrusion methods, a flat ribbon 172 of thermoplastic material is extruded from the extrusion nozzle 174. While the flat ribbon 172 is still soft and malleable, it is passed over a profile drum 176. The profile drum 176 has on its outer surface a plurality of grooves 178 corresponding in shape to the teeth 106, 156 to be formed. A compression drum or belt 180 presses against the flat ribbon 172, compressing the ribbon, and forcing a portion of the flow into the grooves 178. Upon exiting the profile drum 176, the formed ribbon 182 passes through a cooling station 184 where it hardens. The temperature of the flat ribbon 172, the pressure on the ribbon 172 between the compression drum 180 and the profile drum 176, and the cooling time are all established and determined to anticipate the final thickness of the belt, the dimensions of each tooth, and the belt pitch. In this respect, it will be understood that there is a predetermined amount of shrinkage of the formed ribbon 182 as it cools. Upon cooling, the formed belt is collected and stored until it is needed to form an endless belt.

Another method of manufacturing the belt is to start with a homogeneous belt of approximately 7 to 8 mm in thickness, and machine away material between adjacent teeth 106, 156 to a depth of about 3 to 4 mm. This method necessarily generates scrap.

Another method of manufacturing the belt is to start with a homogeneous belt approximately 3-4 mm in thickness, and injection mold teeth at an appropriate belt pitch onto one surface of the belt. In this method, the teeth can be different material. For example, the belt can be formed of polyester such as COPE, with the teeth being formed of a urethane.

Another method of manufacturing the belt is to start with a homogeneous belt approximately 3-4 mm in thickness, and friction mold teeth at an appropriate belt pitch onto one surface of the belt. In this method, the teeth can be different material. For example, the belt can be formed of polyester such as COPE, with the teeth being formed of a urethane. It has been found that applying a 160 Hz orbital motion of a polyester tooth on a polyester belt for three seconds creates enough softening for the tooth to bond to the belt.

It will be understood that certain variations and modifications can be made without departing from the scope of the invention. For example, the length of each tooth need not extend to the edge of the belt as illustrated. A narrow rank of teeth may be sufficient. Further, a narrow belt having a rank of teeth can be preformed and adhered or bonded to an inner surface of a larger belt. Moreover, if desired, coloring pigments and/or antibacterial agents can be added to the thermoplastic prior to extrusion.

While the invention has been specifically described in connection with certain specific embodiments thereof, it is to be understood that this is by way of illustration and not of limitation, and the scope of the appended claims should be construed as broadly as the prior art will permit.

I claim:

1. A method of making a conveyor belt segment with integrally formed teeth for a conveyor belt in a conveyor where the belt is driven by engagement of the teeth with sheaves on a pulley, comprising the steps of:

extruding a substantially unreinforced flat ribbon of a thermoplastic material having an inner surface and an outer surface substantially free of discontinuities, providing a profile drum with a plurality of grooves on its outer surface, corresponding in shape to the teeth;

passing the flat ribbon over the outer surface of the profile drum;

compressing the inner surface of the flat ribbon against the outer surface of the profile drum surface while the flat ribbon is still soft and malleable with a preselected pressure so as to displace spaced apart portions of the inner surface of the flat ribbon by the thermoplastic material flowing into the grooves of the profile drum to thereby form a spaced apart series of teeth between formed flat ribbon portions of generally constant thickness in a formed ribbon;

causing the formed ribbon to exit the profile drum and the compression; and passing the formed ribbon through a cooling station for a predetermined time to shrink the formed ribbon to preselected dimensions and to harden the formed ribbon so as to maintain the preselected dimensions;

all in a continuous process whereby to form an unreinforced, homogeneous belt segment that can be made to a selected length, stretchable through its length, and the ends spliced together to form an endless conveyor belt of predetermined size.

2. The method according to claim 1 wherein the belt is stretchable within a range of up to three percent of its total length.

3. The method according to claim 1 wherein the inner surface and the teeth are treated with an anti-bacterial agent.

4. The method of claim 1 wherein the teeth extend from one edge of the belt to the other.

5. The method of claim 1 wherein the thermoplastic material is one of polyester and polyurethane.

\* \* \* \* \*